United States Patent [19]

Fukumoto

[11] Patent Number: 4,476,838

[45] Date of Patent: Oct. 16, 1984

[54] EXHAUST GAS SUPPRESSOR

[75] Inventor: Masafumi Fukumoto, Amagasaki, Japan

[73] Assignee: Nissin Jabara Industries Co., Ltd., Amagasaki, Japan

[21] Appl. No.: 526,299

[22] Filed: Aug. 25, 1983

[30] Foreign Application Priority Data

Dec. 17, 1982 [JP] Japan ............................... 57-222659

[51] Int. Cl.³ .......................................... F02M 23/14
[52] U.S. Cl. .................................... 123/556; 123/587; 180/189
[58] Field of Search ........................ 123/556, 585–590; 180/189.2, 189.3, 189.4

[56] References Cited

U.S. PATENT DOCUMENTS

| | | | |
|---|---|---|---|
| 2,789,796 | 4/1957 | Mansfield | 123/587 |
| 2,886,019 | 5/1959 | Stearns | 123/556 |
| 3,224,424 | 12/1965 | Mennicken et al. | 123/586 |
| 3,645,509 | 2/1972 | Eckert et al. | 123/587 |
| 3,659,575 | 5/1972 | Lukka | 123/587 |
| 4,167,166 | 9/1979 | Varner et al. | 123/556 |
| 4,274,386 | 6/1981 | Reyes | 123/590 |

Primary Examiner—William A. Cuchlinski, Jr.
Attorney, Agent, or Firm—Gabriel P. Katona

[57] ABSTRACT

An exhaust gas suppressor which suppresses the generation of harmful gases contained in exhaust gases from internal combustion engines, wherein secondary air is efficiently heated to high temperature by a double-tubed heater installed downstream of the exhaust manifold of the internal combustion engine so as to connect to the internal combustion engine and is added to a mixture of primary air and fuel present in the suction manifold, the mixture being then fed to an eddy generating device, which generates eddies in the mixture for the complete gasification.

12 Claims, 14 Drawing Figures

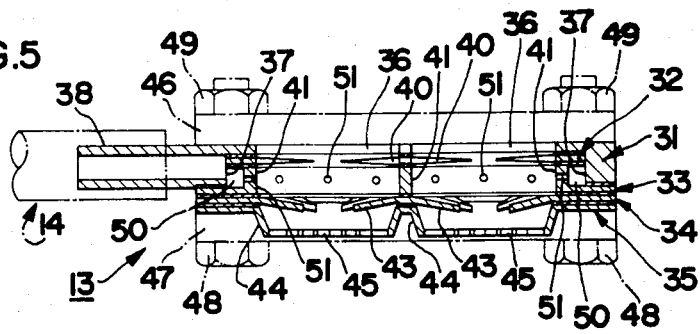
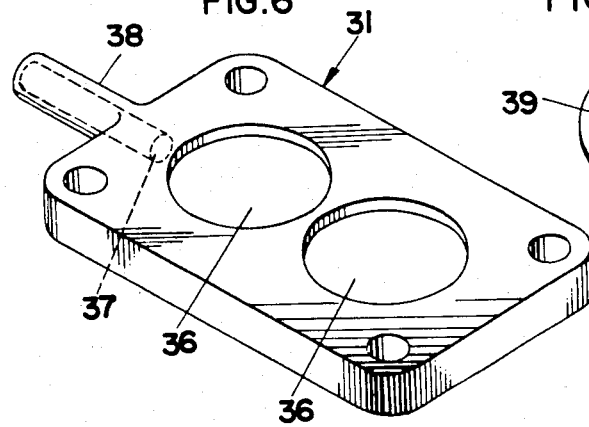
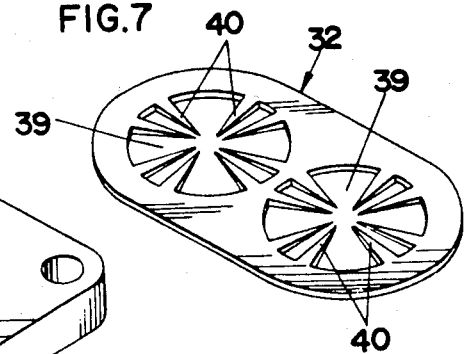
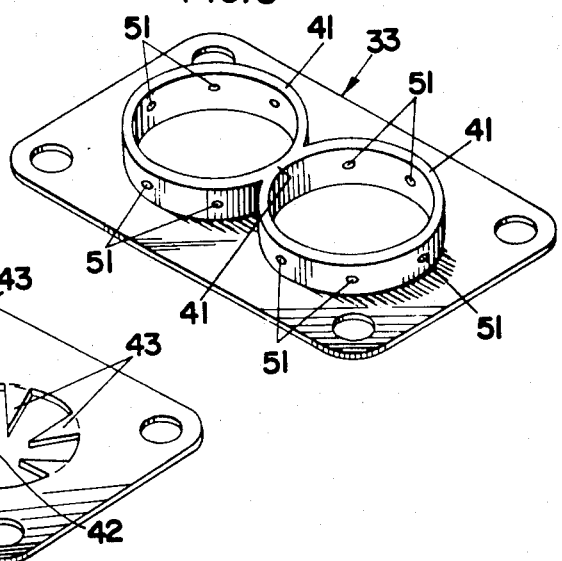
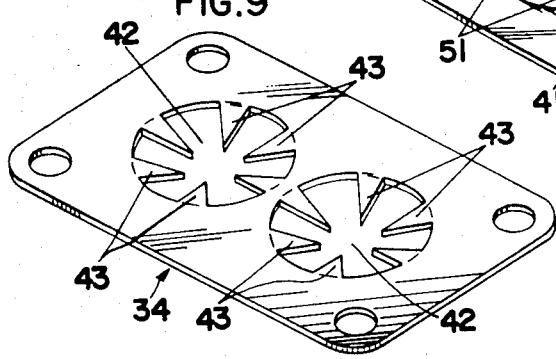

EXHAUST GAS SUPPRESSOR

BACKGROUND OF THE INVENTION

The present invention relates to an exhaust gas suppressor wherein secondary air heated inside the exhaust manifold of an internal combustion engine by the heat of exhaust gases from the exhaust manifold of the engine is fed into the suction manifold downstream of the carburetor so as to prevent a mixture of primary air and fuel to be sucked into the combustion chamber from becoming too rich and assist in complete combustion of said mixture, thereby suppressing the generation of harmful gases contained in exhaust gases as well as reducing the fuel consumption.

There have been various devices for suppressing the generation of harmful gases, and these devices may be classified into two types, namely, wet type and dry type. In the wet type, water or steam is injected into the suction manifold to lower the explosion temperature of the mixture by the heat of gasification of the water or stream, thereby suppressing the generation of nitrogen oxides ($NO_x$). This type, however, requires a tank for storing water and, if such tank is relatively small, frequent supply of water to the tank must be made, while if it is large, a large space for the installation of the tank is required, thus limiting the application of the device. Moreover, when the engine temperature is low, especially at the start of engine operation, part of the water or steam injected into the suction manifold forms droplets when injected into the combustion chamber, so that the distribution of air-fuel mixture in the case of a multi-cylinder engine is degraded. Further, such droplets of water detract from the smoothness of engine operation during transition, namely when the engine is accelerating or decelerating. The wet type device should theoretically be worth mentioning, but it is hardly practicable since it has many problems in practice, as described above.

On the other hand, the dry type device includes the so-called air injection type, wherein secondary air, which is not superheated, is fed to the suction manifold in order to prevent the fuel, which remains in the suction manifold, from making too rich the air-fuel mixture to be fed to the combustion chamber. Thus, the dry type is intended solely to increase the mixing ratio of the primary air-fuel mixture (to, e.g., about 18:1) by feeding secondary air to the suction manifold. Thus, it places importance on the mixing ratio and, is capable of decreasing CO contained in exhaust gases but incapable of decreasing the $NO_x$ and HC contents of exhaust gases. Another one, classified as the dry type, is a suction manifold heating device which does not feed secondary air to the suction manifold but which, instead, externally heats the suction manifold itself to heat the air-fuel mixture therein, thereby assisting in a complete combustion of the mixture so as to suppress the generation of harmful gases contained in the exhaust gases. However, since this type of device is intended to evaporate the droplets of fuel in the air-fuel mixture by heating the suction manifold, such heating requires so much heat as to make it insufficient to make use of the exhaust gases and the cooling hot water as the heat source. Therefore, the heater is necessarily large in size and complicated, besides of being expensive.

In order to solve these problems, the present inventor proposed an invention which was filed as a U.S. patent application having a title "Exhaust Gas Suppressor" on Apr. 24, 1981 under Ser. No. 257,344, and which is now a U.S. Pat. No. 4,362,143 issued Dec. 7, 1982. The apparatus according to that invention, however, still had a problem in that the exhaust resistance increases to lower the accelerating performance with that apparatus because the heater tube was provided in the exhaust manifold, which problem still remained to be solved in the future.

SUMMARY OF THE INVENTION

With the above in mind, a first object of the present invention is to provide an exhaust gas suppressor of the dry type which is more practicable than the presently available dry type.

An important object of the present invention is to provide an exhaust gas suppressor which, in order to eliminate the drawbacks inherent in the so-called air injection type belonging to the conventional dry type exhaust gas suppressor, heats and expands the air-fuel mixture being fed from the carburetor to the suction manifold, by heated secondary air, increases the mixing ratio as much as possible (to, e.g., about 22:1) and then causes the mixture to eddy by an eddy generating device so as to assist in complete combustion of the fuel-lean mixture, thereby decreasing the CO, $NO_x$ and HC contents of the exhaust gases and, at the same time, greatly decreases the fuel consumption rate.

Another important object of the present invention is to provide an exhaust gas suppressor which is provided with a heater capable of making effective use of the heat of exhaust gases exhausted from the exhaust manifold to produce heated secondary air efficiently and, at low cost.

Another object of the present invention is to provide exhaust gas suppression with an air control valve for controlling the amount of heated secondary air to be fed to the suction manifold so that it is in proper relation to the amount of air-fuel mixture prepared by the carburetor.

A further object of the present invention is to provide an exhaust gas suppressor which is simple in construction and can be manufactured at low cost.

These and other objects and features of the present invention will become more apparent from the following description of embodiments of the present invention when read in connection with the accompanying drawings.

BRIEF DESCRIPTION OF THE DRAWINGS

FIG. 5 is an enlarged section of an eddy generating device;

FIG. 6 is a perspective view of a first outer plate in the device of FIG. 5;

FIG. 7 is a perspective view of a first inner plate;

FIG. 8 is a perspective view of a second inner plate;

FIG. 9 is a perspective view of a third inner plate;

DESCRIPTION OF THE PREFERRED EMBODIMENTS

Figure 1:
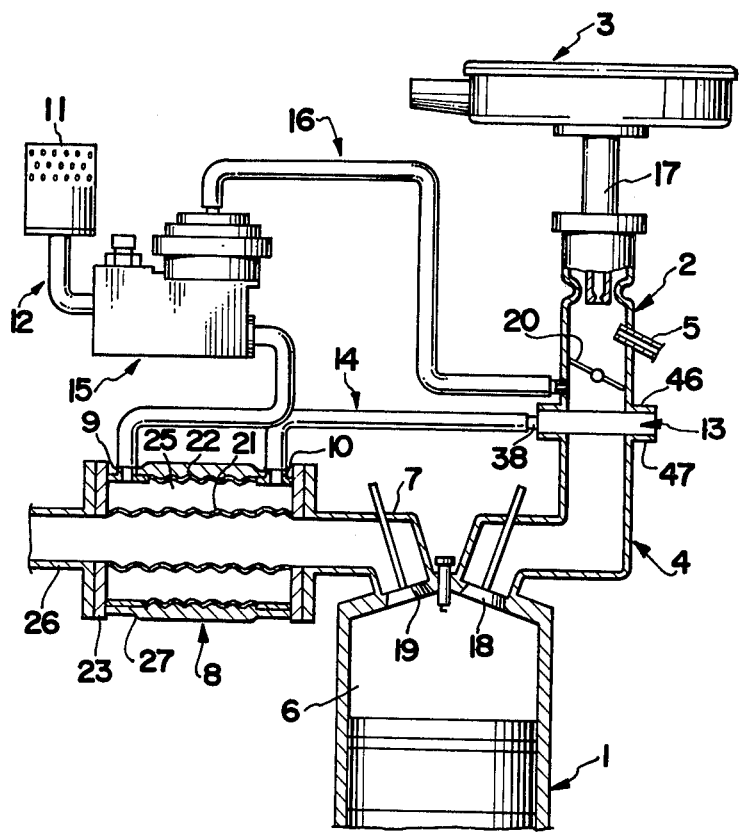
FIG. 1 is a schematic illustration, partly in section, of an exhaust gas suppressor according to an embodiment of the present invention.

Referring to FIG. 1, the numeral 1 denotes an internal combustion engine body; and 2 denotes a carburetor, on which an air cleaner 3 is mounted and downstream of which is disposed a suction manifold 4. In the carburetor 2, primary air from the air cleaner 3 and fuel from a fuel injection nozzle 5 are mixed to form an air-fuel mixture, which is fed through the suction manifold 4 to the combustion chamber 6 of the engine body 1, the gas burnt there being then exhausted as exhaust gases through an exhaust manifold 7. Downstream of the exhaust manifold 7 there is connected a heater 8, and, air inlets and exhaust ports 9, 10 are provided for secondary air in the heater 8 which air is heated by the heat of the exhaust gases. A secondary air introducing tube 12 has an air filter 11 connected to one end thereof, the other end thereof being connected to one of the air inlet and exhaust port 9. An eddy generating device 13 is connected to one end of a heated secondary air feed tube 14, the other end thereof being connected to the other air inlet and exhaust port 10.

The eddy generating device 13 is disposed between the carburetor 2 and the suction manifold 4 and, adapted to impart eddies to the heated secondary air fed from the heated secondary air feed tube 14 and also to the air-fuel mixture fed from the carburetor 2 to the suction manifold 4. Placed between the ends of the secondary air introducing tube 12, there is an air control valve 15 which controls the amount of heated secondary air to be supplied to the suction manifold 4 such that it is substantially inversely proportional to the negative suction pressure in the suction manifold 4, the negative pressure side of said air control valve 15 communicating via a negative pressure tube 16 and the eddy generating device 13 with the suction manifold 4. In FIG. 1, the numeral 17 denotes a conduit which connects the air cleaner 3 to the carburetor 2; 18 denotes the suction valve of the internal combustion engine; 19 denotes the exhaust valve of the engine; and 20 denotes the throttle valve associated with the carburetor.

Figure 2:
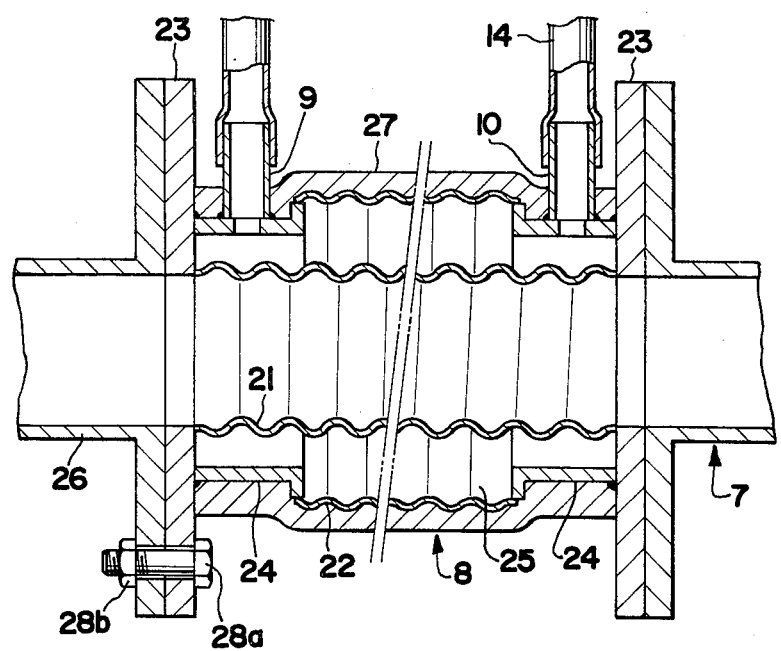
FIG. 2 is an enlarged side view in section showing a heater.

In the heater 8, as shown in FIG. 2, flanges 23 are mounted on both sides of a double tube comprising a bellows-like inner tube 21 and outer tube 22. The outer tube 22 is connected to both flanges 23 by cylindrical connecting members 24. The inner space of the inner tube 21 is open at its both ends, penetrating through both flanges 23, while a heating chamber 25 provided between the inner tube 21 and the outer tube 22 is closed at both ends thereof by both flanges 23 and, at the same time, the heating chamber 25 communicates with the air inlets and exhaust ports for secondary air 9, 10 provided on both connecting members 24. Accordingly, the exhaust gases from the exhaust manifold 7 move into an exhaust conduit 26 through the inner tube 21. During this process, secondary air which is fed to and exhausted from the heating chamber 25 through air inlets and exhaust ports for secondary air 9, 10 is heated through the inner tube 21.

As follows from the above, the heater 8 has a double-tube structure consisting of the inner tube 21 and the outer tube 22. Since the exhaust gases pass the inner tube 21 substantially linearly, the exhaust resistance increases insignificantly. Furthermore, since both the inner tube 21 and outer tube 22 are formed in the form of a bellows, not only the heating by the exhaust gases can be performed easily, but also the heater 8 itself has some flexibility and, may be subjected to some deformation so as to allow the heater to be easily connected to the exhaust manifold side 7 and exhaust conduit side 26 even when mounting the heater there is a slight difference in the axial positions of the exhaust manifold side and exhaust conduit side. Namely, even when the axis of the exhaust manifold side does not coincide with that of the exhaust conduit side. Therefore, the inner tube 21 should be formed as a bellows to the extent that will be sufficient to heat the secondary air and to allow the inner tube to have some flexibility, and the outer tube 22 to the extent that will be sufficient to allow the outer tube to have some flexibility. Numeral 27 denotes an adiabatic material made of ceramic fiber and the like, while numerals 28a and 28b denote a connecting bolt and a nut respectively.

Figure 3:
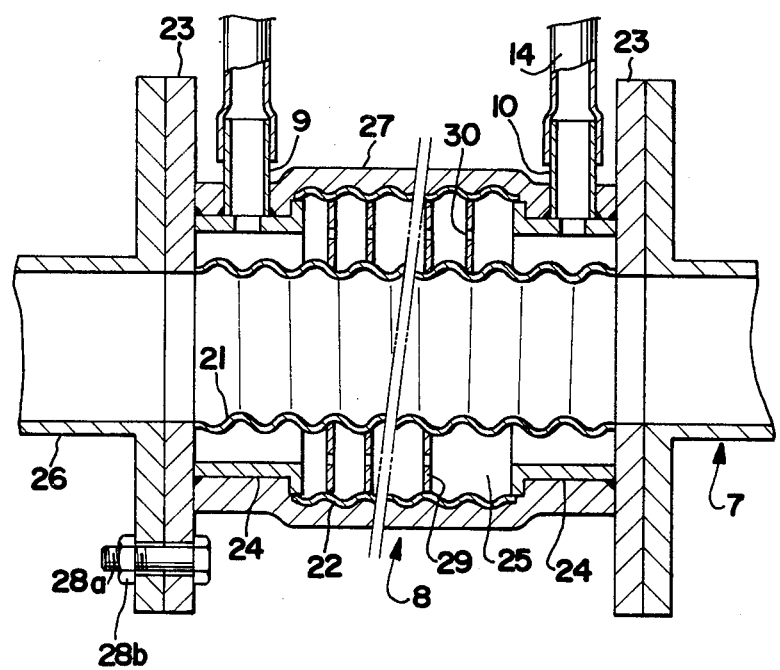
FIG. 3 is an enlarged side view in section showing another embodiment of a heater.

FIG. 3 shows another embodiment of the heater 8 wherein a peripheral wall 29 is provided between the inner tube 21 and the outer tube 22, such wall spirally parttioning the heating chamber 25. On the peripheral wall 29, a plurality of small holes 30 are provided, and the secondary air fed from an air inlet and exhaust port for secondary air 9 spirally circulates itself in the heating chamber 25 along the peripheral wall 29, part of secondary air passing through the small holes 30 to be exhausted from the other air inlet and exhaust port for the secondary air 10. In the meanwhile, the secondary air in the heating chamber 25 is heated to a sufficiently-high temperature by the inner tube 21 and by the peripheral wall 29 heated by the heat of the exhaust gases. When the heater 8 deforms itself due to its flexibility, the peripheral wall 29, forming proper intervals between the inner tube 21 and outer tube 22, also performs a function for circulating the secondary air smoothly in the heating chamber 25.

Figure 4A:
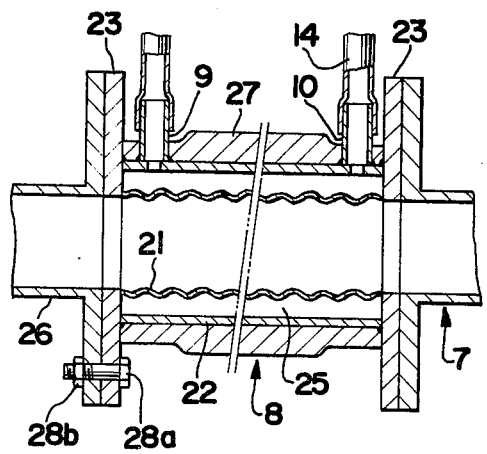
FIGS. 4A and 4B are enlarged side views in section showing still other embodiments of a heater.
Figure 4B:
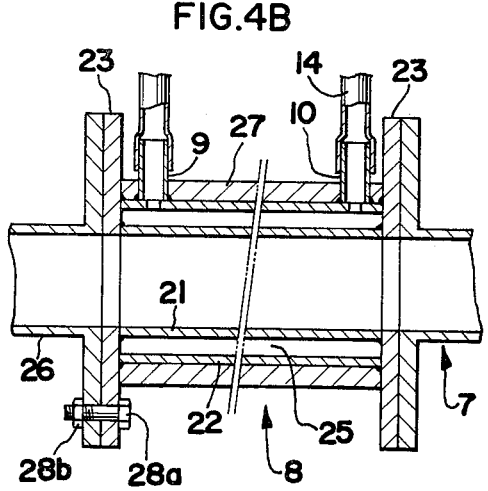

FIGS. 4A and 4B show other embodiments of the heater 8, wherein a straight tube, as shown in FIG. 4A, may be used as the outer tube 22 instead of using a bellows-like tube in mounting the heater 8, provided that the axis of the exhaust manifold side 7 coincides with that of the exhaust conduit side 26. Moreover, as shown in FIG. 4B, both the inner tube 21 and the outer tube 22 may be formed by straight tubes, provided that the heater 8 is formed sufficiently long so as to allow it to perform sufficient heating by the heat of the exhaust gases.

The eddy generating device 13, as shown in FIGS. 5-10, comprises a first outer plate 31 which is relatively thick and rectangular, a first inner plate 32 which is relatively thin and oval, a second inner plate 33 which is relatively thin and has the same shape as the first outer plate 31, a third inner plate 34 which is relatively thin and has the same shape as the first outer plate 31, and a second outer plate 35 which is relatively thin and has the same shape as the first outer plate 31. As shown in FIG. 6, the first outer plate 31 is formed with two circular openings 36 and, with an oval groove 37 on its inner side, it communicates with the openings 36 and adapted to receive the first inner plate 32 and is also formed on one lateral end thereof with a tubular portion 38 communicating with the oval groove 37.

Figure 10:
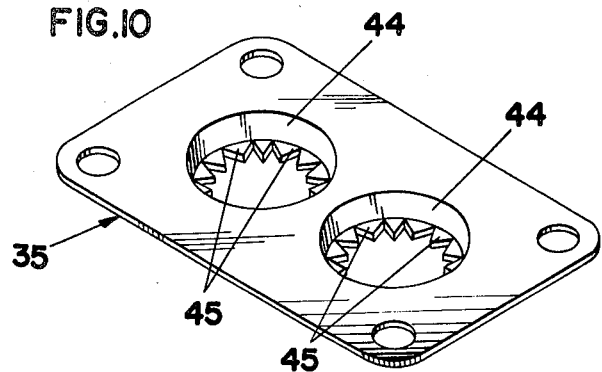
FIG. 10 is a perspective view of a second outer plate.

As clearly shown in FIG. 6, the first inner plate 32 is adapted to fit into the innermost region of the oval groove 37 of the first outer plate 31 and is formed with openings 39 of the same shape as the openings 36 in the first outer plate 31 in opposed relation to the openings 36. The openings 39 have a plurality of spaced, elongated triangular fins 40 extending integrally from the respective peripheries thereof radially toward the respective centers of the openings 39, as shown in FIG. 7. The second inner plate 33, as shown in FIG. 8, is formed with upwardly extending cylindrical portions 41 substantially in opposed relation to the openings 36 in the first outer plate 31, with the respective upper ends of the cylindrical portions 41 abutting against the first inner plate 32 fitted in the innermost region of the oval groove 37 of the first outer plate 31. As a result, it defines an annular groove 50 between the outer peripheral surfaces of the cylindrical portions 41 and the inner peripheral surface of the oval groove 37. The annular groove 50 communicates with the interior of the cylindrical portions 41 through a plurality of communication holes 51 formed in the latter. The third inner plate 34 is disposed under the second inner plate 33 and, as shown in FIG. 9, it is formed with openings 42 of the same shape as the openings 36 in the first outer plate 31 in opposed relationship to the openings 36. The openings 42, as in the case of the first inner plate 32, have a plurality of triangular fins 43 extending integrally from the respective peripheries thereof such that when the third inner plate 34 is placed in connection with the first inner plate 32, the fins 43 do not underlie the fins 40 of the plate 32. The fins 43 are wider and shorter than the fins 40 of the first inner plate 32 and, are bent at their roots somewhat downwardly. As shown in FIG. 10, the second outer plate 35 is disposed below the third inner plate 34 and on the side lying opposite to the first outer plate 31. It is formed with downwardly extending frustoconical portions 44 in opposed relation to the openings 36 in the first outer plate 31. Such frustoconical portions 44 have a plurality of short triangular fins 45 radially inwardly extending from the respective lower end peripheries thereof.

FIG. 5 shows plates 31, 32, 33, 34 and 35 assembled together to complete the eddy generating device 13. The installation of the device 13 is performed by interposing the device 13 between a flange 46 on the lower end of the carburetor 2 and a flange 47 on the upper end of the suction manifold 4, as shown in FIG. 1. It is clamped between the flanges by bolts 48 and nuts 49, and connects the tubular portion 38 of the first outer plate 31 to the outlet end of the heated secondary air feed tube 14.

Figure 11:
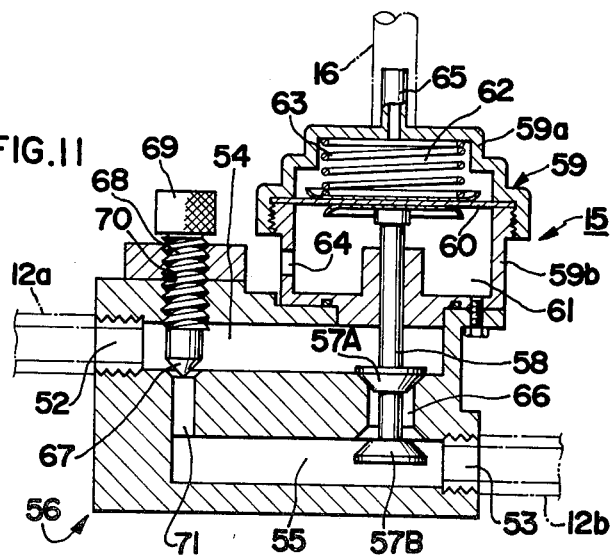
FIGS. 11 and 12 are enlarged sections of an air control valve.
Figure 12:
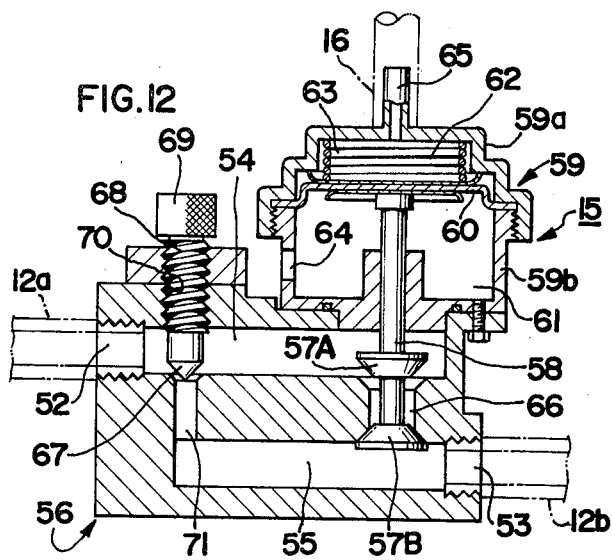

The air control valve 15 will now be described. As shown in FIGS. 11 and 12, it comprises at the central region of the tube 12 introducing the secondary air, a valve supporting base 56, including a first passage 54 and a second passage 55 which have a common inlet 52 and a common outlet 53, the inlet 52 and outlet 53 of the first and second passages 54 and 55 are connected to the inlet and outlet tube portions 12a and 12b of the secondary air introducing tube 12, respectively. A first valve stem 58 is disposed in the first passage 54 and has spaced valves 57A and 57B on its lower portion, the upper end of the first valve stem 58 being fixed to a diaphragm 60 installed in a case 59 composed of an upper case 59a and a lower case 59b. The case 59 is partitioned by the diaphragm 60 into an atmospheric pressure chamber 61 and a negative pressure chamber 62. A coil spring 63 disposed in the negative pressure chamber 62 to hold the diaphragm 60 in a fixed position. The atmospheric pressure chamber 61 opens to the atmosphere through an opening 64. The negative pressure chamber 62 communicates with the suction manifold 4 downstream of the carburetor 2 through the negative pressure tube 16 connected to an attaching tube 65 of the upper case 59a, the arrangement being such that the diaphragm 60 is moved under the pressure difference between the atmospheric pressure chamber 61 and the negative pressure chamber 62, whereby the valves 57A and 57B on the first valve stem 58 control the degree of opening of a valve port 66.

Thus, when the pressure in the atmospheric pressure chamber 61 is in equilibrium with the pressure in the negative pressure chamber 62 which is, for example, when the engine is at rest, the diaphragm 60 is held in its fixed position, as shown in FIG. 11, so that the valve 57A closes the valve port 66 to block the first passage. When the negative pressure in the suction manifold 4 is relatively low as is the case, for example, when the engine is operating at constant speed or it is accelerating, the diaphragm 60 is raised from the fixed position of FIG. 11 to an intermediate position in a predetermined stroke against the forst of the coil spring 63, so that the degree of opening of the valve port 66 provided by the valves 57A and 57B is at a maximum and, hence, the rate of flow of air through the first passage 54 is at a maximum. When the suction negative pressure in the suction manifold 4 reaches a maximum which is the case, for example, when the engine is decelerating, the diaphragm 60 is raised to the upper limit of the predetermined stroke as shown in FIG. 12, so that the valve 57B closes the valve port 66 to block the first passage 54 and cut-off the flow of air through the first passage 54. Furthermore, when the engine is idling or running at a low speed, the negative suction pressure in the suction manifold 4 is considerably high, so that the diaphragm 60 is raised close to the upper limit of the stroke, with the valve port 66 being slightly opened by the valve 57B to allow a slight amount of air to flow through the first passage 54.

On the other hand, a second valve stem 68 having a valve 67 on its lower end is disposed in the second passage 55. The second valve stem 68 has threads cut on its peripheral surface and is screwed into a valve stem attaching threaded hole 70 formed in the valve attaching base 56. By turning the head 69 of the valve stem 68 by hand and thereby moving the valve stem axially, the valve 67 opens and closes the valve 71 to open and close the second passage 55. Thus, the valves 57A and 57B on the first valve stem 58 automatically control the rate of flow of air through the first passage 54 by the action of the diaphragm 60 responding to the negative suction pressure in the suction manifold 4, while the valve 67 on the second valve stem 68 is manually operable to control the rate of flow of air through the second passage 55. Usually, the valve 67 on the second valve stem 68 is adjusted so as to maintain the second passage 55 at the minimum degree of opening.

Figure 13:
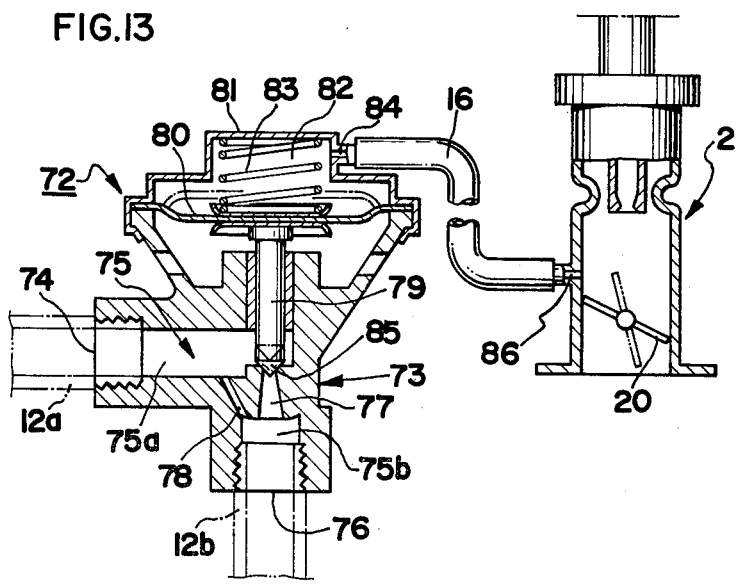
FIG. 13 is a section of another embodiment of an air control valve.

FIG. 13 shows an air control valve 72 according to another embodiment of the invention. It comprises a valve attaching base 73 which includes a transverse passage portion 75a having an inlet 74 and a vertical passage portion 75b having an outlet 76. A valve port 77 is provided between the transverse and vertical passage portions 75a and 75b for establishing the communication therebetween. A communication passage 78 leads from the transverse passage portion 75a directly to the vertical passage portion 75b. A valve stem 79 is disposed in the transverse passage portion 75a and has a valve 85 formed on the lower end thereof. The upper end of the valve stem 79 is fixed to a diaphragm 80 which cooperates with a casing 81 to define a negative pressure chamber 82. A coiled spring 83 is disposed between the diaphragm 80 and casing 81. The communication between the negative pressure chamber 82 and the carburetor 2 is established by a negative pressure tube 16 whose opposite ends are respectively connected to an attaching tube 84 provided in the upper portion of the casing 81 and to an attaching tube 86 provided upwardly of the throttle valve 20 associated with the carburetor 2. The inlet 74 and outlet 76 of the passage 75 are connected to the inlet and outlet tube portions 12a and 12b of the secondary air introducing tube 12, respectively.

In the operation of the air control valve 72, if the pressure in the negative pressure chamber 82 is equal or nearly equal to atmospheric pressure, the diaphragm 80 is not actuated, so that the valve port 77 remains closed by the valve 85 of the valve stem 79. When the throttle valve 20 is almost closed which is the case, for example, when the engine is idling or decelerating, the carburetor 2 is almost at atmospheric pressure and, the amount of mixed gas being sucked in is small, so that the diaphragm 80 is not actuated. Therefore, because of the closure of the valve port 77, there is no positive supply of secondary air from the inlet tube portion 12a to the outlet tube portion 12b of the secondary air introducing tube 12. Even under such conditions, however, it is so arranged that a constant and small amount of secondary air is being supplied via the communication passage 78. If the degree of opening of the throttle valve increases which is the case, for example, when the engine is accelerating or running at constant speed, the amount of mixed gas being sucked into the carburetor 2 increases, with the resulting sucking force pulling upwardly the diaphragm 80 to open the valve port 77, so that the secondary air in the transverse passage portion 75a of the passage 75 flows through the valve port 77 into the vertical passage portion 75b, which means that positive supply of the secondary air is brought about.

The exhaust gas suppressor constructed in the manner described above operates as follows.

When the engine is idling or running at low speed, there is a considerably high negative pressure produced in the suction manifold 4, with the result that secondary air flows from the air filter 11 successively through the secondary air introducing tube 12, the heater 8, the heated secondary air feed tube 14 and the eddy generating device 13 into the suction manifold 4. In this case, the secondary air being fed from the introducing tube 12 to the heater 8 is heated to about 600° C. by the heat of exhaust gases exhausted from the exhaust manifold 7 when flowing through the heating chamber 25 in the heater 8. The heater 8 receives little the exhaust resistance because the exhaust gases pass substantially linearly through the inner tube 21. Since the inner tube 21 is formed in the form of a bellows, the heating by the heat of the exhaust gases can be performed easily and, at the same time, since the outer tube 22 is also formed in the form of a bellows, the whole heater 8 has some flexibility to the extent that it can easily be attached between the exhaust manifold 7 and the exhaust conduit 26. Furthermore, a peripheral wall 29 spirally provided between the inner tube 21 and the outer tube 22 will be effective to allow secondary air to circulate smoothly in the heating chamber 25, the secondary air being heated very effectively to a high temperature.

The secondary air heated to high temperature by the heater 8 is introduced through the feed tube 14 and then through the tubular portion 38 of the eddy generating device 13 into the annular groove 50. The heated secondary air introduced into the annular groove 50 is blown, in the state of a hot blast, through the communication holes 51 in the cylindrical portions 41 of the second inner plate 33, into the cylindrical portions 41. The temperature of the hot blast is about 500° C. On the other hand, a mixture of fuel and primary air prepared in the carburetor 2 is drawn into the suction manifold 4 through the eddy generating device 13 by the negative suction pressure. In this case, the mixed gas (with a mixing ratio of about 15:1) introduced into the eddy generating device 13 through the openings 36 in the first outer plate 31 meets the heated secondary air, namely, hot blast blown in through the communications holes 51 in the second inner plate 33 and, is heated by the hot blast and expanded to become fuel-lean until the mixing ratio is about 22:1 while it is caused to eddy successively by the elongated triangular fins 40 of the first inner plate 32, the triangular fins 43 of the third inner plate 34 and the triangular fins 45 of the second outer plate 35. As a result, the mixed gas is completely gasified. Since the mixed gas, though leaned to the extent of having a mixing ratio of about 22:1, has been heated to a high temperature by the heated secondary air and completely gasified by being eddied, it can be easily ignited for complete combustion in the engine. As a result, the CO, $NO_x$ and HC contents of exhaust gases produced by combustion are at a minimum and, at the same time, the consumption of fuel can be greatly reduced.

Furthermore, the amount of heated secondary air to be fed to the suction manifold 4 is automatically controlled by the air control valve 15 so that it is inversely proportional to the negative suction pressure in the suction manifold 4. Thus, when the negative suction pressure is relatively high, which is the case, for example, when the engine is idling or running at low speed, a small amount of heated secondary air is fed; when the negative suction pressure is relatively low which is the case, for example, when the engine is running at constant speed or accelerating, a large amount of heated secondary air is fed; and when the negative suction pressure is at a maximum which is the case, for example, when the engine is decelerating, the supply of heated secondary air is reduced to a minimum or zero. Therefore, it follows that heated secondary air is supplied in proportion to the amount of mixed gas prepared by the carburetor and that, as a result, the mixing ratio of the lean gas fed through the suction manifold to the engine, is maintained constant. It follows, that irrespective of the operating condition of the engine, the gas inside the engine can be burnt completely, thereby making it possible to minimize the amount of harmful gases and save fuel consumption. The present exhaust gas suppressor is simple in the arrangement for heating secondary air and, is easier to install and less expensive than a conventional exhaust gas suppressor, as well as it is capable of preventing increases in the exhaust resistance caused by installing the heater therein.

What is claimed is:

1. An exhaust gas suppressor for internal combustion engines, comprising a heater in the form of a double tube construction connected downstream of the exhaust manifold of the internal combustion engine for heating the secondary air by the heat of exhaust gases in said manifold, a secondary air introducing tube opening at one end thereof to the atmosphere through an air filter and connected at the other end thereof to one of the air inlets and exhaust ports for secondary air of said heater, a heated secondary air feed tube connected at one end thereof to the other air inlet and to the exhaust port for secondary air of said heater and communicating at the other end thereof with the suction manifold for supplying secondary air heated by said heater to a mixture of primary air and fuel prepared by the carburetor, an eddy generating device disposed in the suction manifold and connected to the other end of said heated secondary air feed tube for eddying said primary air-fuel mixture and heated secondary air added thereto, and an air control valve placed between the ends of said secondary air introducing tube for controlling the amount of heated secondary air to be supplied in relation to the amount of said mixed gas.

2. An exhaust gas suppressor as set forth in claim 1, wherein an inner tube of said double tube is formed in the form of a bellows.

3. An exhaust gas suppressor as set forth in claim 1, wherein both the inner tube and an outer tube of said double tube are formed in the form of a bellows.

4. An exhaust gas suppressor as set forth in claim 1, wherein said double tube of said heater consisting of the inner tube and outer tube is formed each in the form of a bellows, a flange being attached at both ends of said double tube, said outer tube being respectively connected to said flanges by cylindrical members, the inner space of said inner tube opening at the ends thereof, penetrating said flanges, and a heating chamber provided between said inner tube and outer tube being closed at both ends thereof by said flanges and communicating with the air inlets and exhaust ports for secondary air provided on said connecting members.

5. An exhaust gas suppressor as set forth in claim 4, wherein a peripheral wall which spirally partitions said heating chamber is provided between said inner tube and outer tube.

6. An exhaust gas suppressor as set forth in claim 5, wherein a plurality of small holes are provided on said peripheral wall.

7. An exhaust gas suppressor as set forth in clam 4 wherein said heater is coated with an adiabatic material on its outer peripheral surface.

8. An exhaust gas suppressor as set forth in claim 1 wherein said eddy generating device comprises an outer plate and two inner plates, said outer plate having a plurality of circular openings formed in the upper surface thereof and an oval groove formed in the lower surface thereof and having a tubular portion formed on one lateral side thereof communicating with said oval groove, one of said inner plates having upwardly extending cylindrical portions opposed to said openings in said outer plate, said cylindrical portions being fitted in said oval groove in said outer plate to define an annular groove between said cylindrical portions and said oval groove, said annular groove communicating with the interiors of said cylindrical portions through a plurality of communication holes formed in said cylindrical portions, the other inner plate having openings of substantially the same shape as said openings in said outer plate in opposed relation to the latter, said openings in said other inner plate each having a plurality of triangular fins extending from the peripheral edge thereof.

9. An exhaust gas suppressor as set forth in claim 8, including another inner plate disposed between said outer plate and said one inner plate, said another inner plate having openings of the same shape as the openings in said outer plate in opposed relation to the latter, said openings in said another inner plate each having a plurality of elongated triangular spaced fins extending from the peripheral edge thereof radially toward the center of the opening, and another outer plate disposed below said other inner plate and having downwardly extending frustoconical portions at positions corresponding to the openings in said outer plate, said frustoconical portions each having a plurality of short triangular fins extending radially inwardly from the peripheral edge of the lower end thereof.

10. An exhaust gas suppressor as set forth in claim 1 wherein said air control valve includes a valve attaching base having a passage communicating with the secondary air introducing tube, said passage having disposed therein a valve stem having two spaced valves on the lower end thereof, the upper end of said valve stem being fixed to a diaphragm installed in a case attached to said base, said case being internally partitioned into an atmospheric pressure chamber and a negative pressure chamber by said diaphragm, said atmospheric pressure chamber opening to the atmosphere, said negative pressure chamber communicating with the suction manifold through a negative pressure tube, the arrangement being such that said diaphragm is displaceable in response to the negative suction pressure in the suction manifold, thus moving the valve stem to control the degree of opening of the valve port of said passage by said two valves on said valve stem.

11. An exhaust gas suppressor as set forth in claim 10, wherein said valve attaching base is provided with a second passage having an inlet and an outlet in common with said first passage, said second passage having installed therein a second valve stem having a valve on the front end thereof, said second valve stem being screwed into said base so that it may be manually turned for axial movement so as to control the degree of opening of the valve port of the second passage by the valve of said second valve stem.

12. An exhaust gas suppressor as set forth in claim 1 wherein said air control valve comprises a valve attaching base having a passage communicating with the secondary air introducing tube, a valve stem disposed in said passage and having a valve for opening and closing the valve port of said passage, the upper end of said valve stem being fixed to a diaphragm which defines a negative pressure chamber communicating with the carburetor through a negative pressure tube so that the diaphragm is actuated in relation to the amount of suction of mixed gas in the carburetor to thereby control the degree of opening of the valve port by said valve, and a communication passage for establishing communication between the inlet portion and outlet portion of said passage so that a constant and small amount of secondary air is flowing through said communication passage into said passage at all times.

* * * * *